July 29, 1969  M. A. ROSENBERG  3,458,783

HERMETICALLY SEALED CAPACITOR

Filed April 29, 1968

INVENTOR.
MICHAEL A. ROSENBERG
BY Perry E. Turner
ATTORNEY

United States Patent Office 3,458,783
Patented July 29, 1969

3,458,783
HERMETICALLY SEALED CAPACITOR
Michael A. Rosenberg, San Fernando, Calif., assignor to San Fernando Electric Mfg. Co., San Fernando, Calif., a corporation of California
Filed Apr. 29, 1968, Ser. No. 725,025
Int. Cl. H01g 1/14, 3/06, 1/00
U.S. Cl. 317—242                                    9 Claims

ABSTRACT OF THE DISCLOSURE

A monolithic ceramic capacitor chip has opposed edges coated with silver. These edges are located between and abutted by copper surfaces of enlarged ends of leads for the capacitor. A glass sleeve surrounds the chip and the enlarged ends, and a glass-to-metal seal is effected between the sleeve and the enlarged ends, directly or through glass beads on such ends. By virtue of the heat seal, the abutting copper and silver surfaces are caused to be bonded together.

BACKGROUND OF THE INVENTION

Field of the invention

This invention relates to miniature ceramic capacitors, and more particularly to a unique, hermetically sealed monolithic capacitor structure.

Description of the prior art

Miniature ceramic capacitors are employed in many critical applications in which it is desired that environmental factors shall have minimum effect on the values and performance characteristics of such components. For the capacitor bodies, or chips, such ceramic capacitors are adequate for the desired purposes. As is well known, however, problems arise with the leads of such capacitors, in that there is occasional loosening of the leads at the points where they contact the capacitor bodies. Such loosening may occur, for example, as a result of sustained vibrations. Also, where the leads are not in adequate contact with the capacitor body, such points of contacts become deteriorated through the build-up of oxides. Accordingly, while such components may function properly when they are initially installed, they are subject to breakdown at the moment they are most needed.

Considerable time, effort and expense have been devoted in the industry to the foregoing problems. However, until the advent of the present invention, no satisfactory solution is known to have been made.

SUMMARY OF THE INVENTION

The invention embraces a ceramic capacitor chip in which enlarged heads of leads are in physical contact with metal coatings on the edges thereof, and in which a surrounding glass envelope is heat-sealed to the heads of the leads to effect a bond or weld between the contacting metals.

DESCRIPTION OF ILLUSTRATIVE EMBODIMENTS

Figure 1:
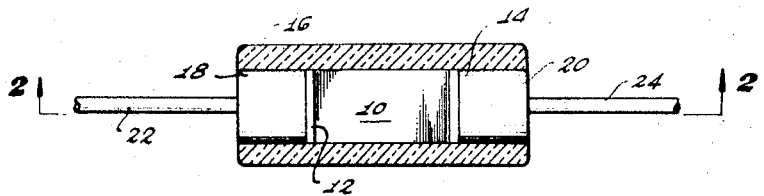
FIG. 1 is a longitudinal sectional view of one embodiment of my invention.
Figure 2:
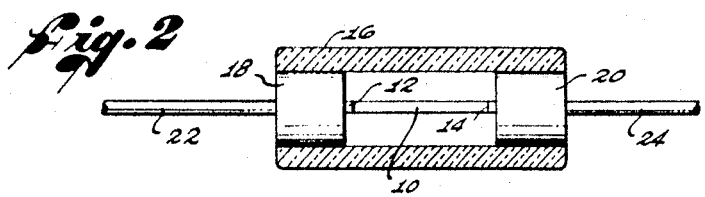
FIG. 2 is a longitudinal sectional view taken along the line 2—2 of FIG. 1.

Referring to FIGS. 1 and 2, there is shown a ceramic capacitor chip 10 which has metal coatings 12, 14 covering its opposite ends or edges. In typical fashion, respective metallic electrodes embedded in the chip body 10 extend to the opposite ends of the body, where they are conductively contacted by the coatings at those ends. Typically, the coatings 12, 14 are of silver.

Figure 3:
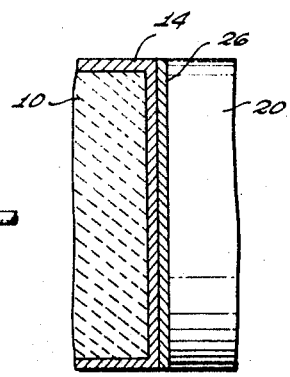
FIG. 3 is an enlarged, fragmentary sectional view of the abutting portions of the enlarged head of one lead and the adjacent coated edge of the capacitor, to aid in explaining the bonding together of such contacting surfaces.

As shown, the chip 10 is inserted in a glass sleeve 16. Extending into the ends of the sleeve 16 are enlarged heads 18, 20 of respective leads 22, 24, with the inner faces of such heads 18, 20 abutting the edge surfaces of the coatings 12, 14. The leads typically are formed so that the heads 18, 20 are of one material, e.g., a nickel-iron alloy, to which copper wires are brazed or welded, or soldered. However, if desired, they may be formed of a single metal alloy. The heads 18, 20 preferably have their inner faces clad with a film of metal with a lower melting point, e.g., copper or aluminum. As shown in FIG. 3, the inner face of the head 20 is provided with a copper film 26.

With the parts assembled as above described (but without the leads 22, 24 attached to the heads 18, 20 where they are not formed of single wire elements), compressive force is applied to the outer ends of the heads 18, 20 while the assembly is subjected to sufficiently high temperatures in an inert atmosphere, e.g., nitrogen, to both form a seal between the confronting surfaces of the heads 18, 20 and the glass sleeve 16, and to weld the abutting silver and copper surfaces together. Thus, the assembly upon being cooled forms a hermetically sealed monolithic capacitor in which the contacting surfaces are physically and conductively secured together and cannot be separated by severe vibrations.

Thus the abutting metal surfaces are fused together by a parent weld, i.e., a weld formed of the two metals and without the use of flux or solder for the contacting surfaces of the silver coatings 12, 14 and heads 18, 20. Further, migration of silver of the coatings is minimized. Another advantage is that this construction permits wire leads subsequently to be soldered or welded to the heads 18, 20 without affecting the mechanical integrity of the bond between the silver coatings and the heads. In this latter connection, the axial thicknesses of the heads 18, 20 prevent the silver coatings from being adversely affected by the heat during the times the leads 22, 24 are brazed to the heads 18, 20. Similarly, this construction permits other parts to be welded or soldered to the leads adjacent the capacitor without adversely affecting the silver coatings.

Where the glass sleeve 16 and heads 18, 20 are occupied by the inert atmosphere in which the assembly was heat-sealed, the glass-to-metal seals between the heads 18, 20 and the sleeve 16 eliminate even the slightest possibility of the contacting surfaces being exposed to an oxidizing atmosphere.

If desired, of course, the heads 18, 20 may be formed of the same cross section as the chip 10, and the sleeve 16 may be formed with a rectangular opening of the outer dimensions of the chip, in which case the spaces above referred to are eliminated.

Figure 4:
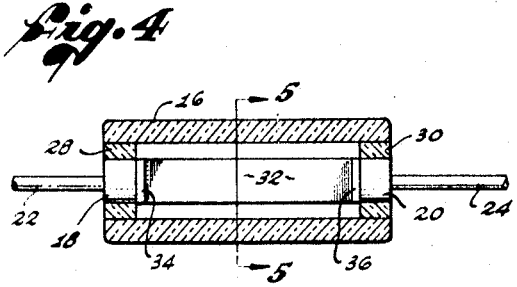
FIG. 4 is a longitudinal sectional view of another embodiment of a capacitor in accordance with my invention.
Figure 5:
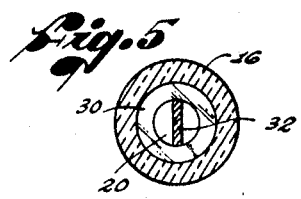
FIG. 5 is a sectional view taken along the line 5—5 of FIG. 4.

FIGS. 4 and 5 illustrate a capacitor in accordance with my invention in which the parts are assembled as previously described, but wherein there is the addition of glass beads 28, 30 surrounding the heads 18, 20. A capacitor chip 32 with silver end coatings 34, 36 is shown of a width equal to the diameter of the heads 18, 20. The glass beads 28, 30 may initially be sealed to the heads 18, 20 before they are inserted in the sleeve 16. In such case, and with axial compression applied to the assembly as previously described, the assembly is heated to effect a glass-to-glass seal between the confronting surfaces of the beads 28, 30 and the sleeve 16. Alternatively, the beads 28, 30 may initially be slidably mounted on the heads 18, 20, whereupon the heating process effects a glass-to-metal seal between the heads 18, 20 and the confronting surfaces of the beads 28, 30, and a glass-to-glass seal between the confronting surfaces of the beads 28, 30 and the sleeve 16.

For a sleeve 16 of given diameter, comparison shows that the embodiment of FIGS. 4 and 5 may accommodate a larger capacitor than the embodiment of FIGS. 1 and 2. The heads 18, 20 are smaller for this purpose, of course, but there is still sufficient face-to-face contact area for the desired bond between the heads and the metal coatings.

Figure 6:
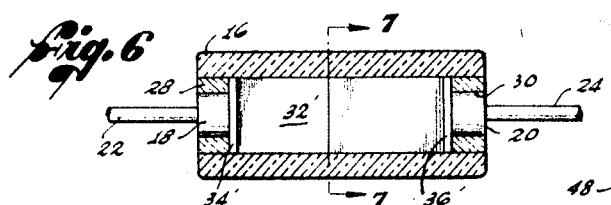
FIG. 6 is a longitudinal sectional view of still another embodiment of a capacitor in accordance with my invention.
Figure 7:
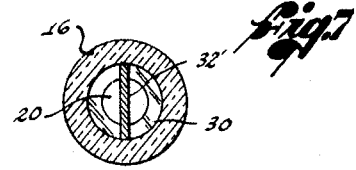
FIG. 7 is a sectional view taken along the line 7—7 of FIG. 6.

FIGS. 6 and 7 illustrate the same arrangement of parts as in FIGS. 4 and 5, but wherein a chip 32' is of a width equal to the inner diameter of the sleeve 16. This illustrates, of course, that a sleeve of a given diameter can accommodate capacitors of different sizes. An additional point to be noted, however, is that the silver coatings 34', 36' on the ends of the chip 32' engage the inner wall of the sleeve 16. Accordingly, the above-described heating of the assembly also effects a glass-to-metal seal between the abutting surfaces of the glass sleeve 14 and the silver coatings 34', 36'.

Figure 8:
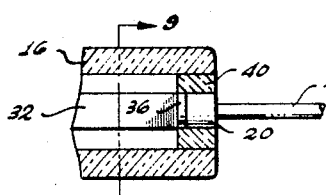
FIG. 8 is a fragmentary, longitudinal sectional view of still another embodiment of a capacitor in accordance with my invention.
Figure 9:
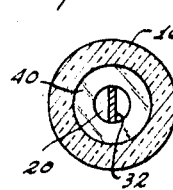
FIG. 9 is a sectional view taken along the line 9—9 of FIG. 8.

In the embodiments shown in FIGS. 4–7, the beads 28, 30 are shown of the same axial length as the heads 18, 20. FIGS. 8 and 9 illustrate an arrangement in which a bead 40 placed around the head 20 extends inwardly past the head. Thus, the combination of the head 20 and bead 40 forms a countersunk plug. The diameter of such opening is such as to slidably receive the end of the chip 32, whereby the silver coating 36 abuts the confronting surfaces of the head 20 and the bead 40. Accordingly, heating of an assembly such as shown in FIGS. 8 and 9 effects glass-to-metal seals between the bead 40 and both the head 20 and silver coating 36, and also a glass-to-glass seal between the bead 40 and the sleeve 14. Of course, there is also effected the same welding between the abutting metal surfaces of the head 20 and the metal coating 36, as in the embodiments of FIGS. 1–7. The arrangement of FIG. 8 has the additional advantage that the inner ends of the beads slidably receive the ends of the chip to hold the chip in place during heating.

Figures 10, 11:
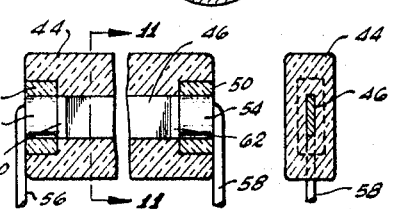
FIG. 10 is a longitudinal sectional view of still another embodiment wherein all parts are of rectangular cross section.
FIG. 11 is a sectional view taken along the line 11—11 of FIG. 10.

FIGS. 10 and 11 illustrate an embodiment of my invention wherein a glass sleeve 44 has a rectangular opening to slidably receive and snugly fit a chip 46. Beyond the ends of the chip, the rectangular openings are enlarged to slidably receive rectangular beads 48, 50 which are sealed to rectangular heads 52, 54. Leads 56, 58 are brazed to the heads 52, 54 so as to extend at right angles thereto. In the same manner as the arrangements previously described, the confronting surfaces of the beads 48, 50 and the sleeve 44 are heat sealed to effect the weld between the confronting surfaces of the heads 52, 54 and the silver coatings 60, 62 of the chip 44. In this arrangement, of course, there are no gaps as in the arrangements wherein a rectangular chip is surorunded by a cylindrical sleeve.

As will now be apparent, my invention provides a monolithic capacitor from a number of parts that have heretofore been subject to being separated. Various modifications can be made in the embodiments illustrated and described without departing from the spirit and scope of my invention. Accordingly, I do not intend that my invention be limited, except in accordance with a reasonable interpretation of the appended claims.

I claim:

1. In combination:
an electrical component having metal-clad ends;
a pair of flexible metal leads each with an enlarged inflexible head having an end face abutting a respective metal-clad end of said component, said abutting component ends and end faces being of dissimilar metals;
and a glass sleeve surrounding said component and heads, with direct physical glass-to-metal surface contact between said sleeve and the lateral surfaces of said heads, said physically contacting glass and metal surfaces being heat sealed, and the abutting metals of the component ends and head faces being fused by a parent weld.

2. The combination of claim 1, wherein said component is a monolithic ceramic capacitor chip having respective electrodes embedded therein extending to the metal-clad ends.

3. The combination of claim 2, wherein the heads substantially fill the ends of said sleeve and wherein the heat seal effects a glass-to-metal seal between the confronting surfaces of said heads and said sleeve.

4. The combination of claim 2, wherein respective glass beads are within the ends of said sleeve and surrounding said heads, and wherein the heat seal comprises glass-to-metal seals between the confronting head and bead surfaces and glass-to-glass seals between the confronting bead and sleeve surfaces.

5. The combination of claim 4, wherein each bead extends inwardly of the associated head to surround at least part of the adjacent metal coating.

6. The combination of claim 3, wherein said sleeve is cylindrical and said chip is flat, the width of said chip being substantially equal to the inner diameter of said sleeve.

7. The combination of claim 4, wherein said sleeve, beads and heads are cylindrical, each head and its surrounding bead are coextensive, and the width of said chip is substantially equal to the inner diameter of said sleeve.

8. The combination of claim 2, wherein the metal coatings are silver, and said end faces of said heads are copper-clad.

9. The combination of claim 3, wherein said chip and heads are flat and of substantially the same cross section, and wherein the lateral surfaces of said chip and heads are matingly engaged by said sleeve.

References Cited

UNITED STATES PATENTS

| | | | |
|---|---|---|---|
| 3,064,070 | 11/1962 | Douglass | 174—52 |
| 3,307,134 | 2/1967 | Griest | 338—237 |
| 3,169,216 | 2/1965 | Layton. | |
| 3,192,497 | 6/1965 | Bender. | |
| 3,235,939 | 2/1966 | Rodriguez. | |

E. A. GOLDBERG, Primary Examiner

U.S. Cl. X.R.

174—50, 52; 317—261; 338—273, 274, 329